Figure 1:
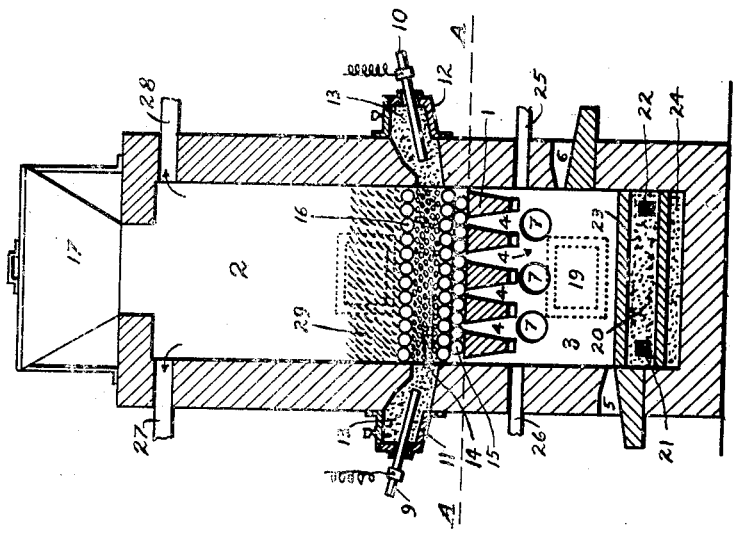

H. F. D. SCHWAHN.
ELECTRIC FURNACE.
APPLICATION FILED SEPT. 26, 1912.

1,105,538.

Patented July 28, 1914.

WITNESSES:
Max Dorn
N. A. Davis

INVENTOR.
Heinrich F. D. Schwahn.

UNITED STATES PATENT OFFICE.

HEINRICH F. D. SCHWAHN, OF BELLEVILLE, ILLINOIS.

ELECTRIC FURNACE.

1,105,538.  Specification of Letters Patent.  Patented July 28, 1914.

Application filed September 26, 1912. Serial No. 722,464.

*To all whom it may concern:*

Be it known that I, HEINRICH F. D. SCHWAHN, a citizen of the United States, and resident of the city of Belleville, in the county of St. Clair and State of Illinois, have invented a new and useful Improvement in Electric Furnaces, of which the following is a full, clear, and exact description, reference being had to the accompanying drawings, forming part of this invention.

My invention relates to the reduction of metal bearing materials such as skimmings, scruff and drosses from remelting and casting metals of any description and the refining of brass turnings and other metal scraps, but also ores or compounds especially those with an aluminum content may be treated and reduced by this method which is designed to provide a process which will practically avoid the loss of any metal and work rapidly and cheaply. And furthermore relates to apparatus particularly adapted for and designed to accomplish the above in a practical, effective and commercial manner.

Essentially my invention consists in subjecting metal bearing materials in presence of a reducing agent in some form, gases included, to the radiant heat from a resister within an electric circuit and permitting the resultant fused mass to pass through said resister to be subjected thereby to higher heats in a reducing atmosphere and complete the reduction and refining of their metal content.

In carrying out my method I employ a substantially closed electric furnace which is of the resistance type, and consists essentially, taking the smallest size of a furnace for an example, of two electrodes, spaced from each other, and an intermediate resistance body of a carbonaceous composition in which the heat is generated, and through which the resultant fused mass from the material under treatment is permitted to pass, and use in conjunction therewith some form of a reducing agent preferably carbonaceous materials such as for instance hydrocarbons, which will unite with the oxygen of the oxids in the material under treatment and that of the air present in the furnace and produce a non-oxidizing atmosphere whereby the outer air is excluded throughout the furnace. And in the space above the resistance body of carbonaceous material is charged the metal bearing materials under treatment, while I employ in the lower portion of the furnace a substantially closed crucible or well, into which the reduced or fused metal descends with the slag, if any, and enabling it to collect in a reducing atmosphere, thus protecting it from oxidation, and the metal may be tapped out directly from the well through a taphole or from condensers in case some of the metal, such as sodium or zinc, has been volatilized and recovered in said condensers. I also employ some refractory checkers upon which the carbonaceous resistance body is spread to relieve automatically and continuously said resistance body from the fused material passing into and through the same thereby preventing a bridging over the resister by the reduced metal, and through which the electric current would pass between the electrodes without affecting the resister, and therefore would make the process inoperative for a continuous operation. And on the other hand these checkers permit or accelerate the evolving of the naturally, or purposely made, volatile constituents of the charge by certain fluxes, as known to those skilled in the art, for their separate recovery from the non-volatile metals and slag, if any, and which may suffice if the material under treatment is of an electrically resisting nature, such as for instance oxids mixed with carbon, drosses, sulfate of aluminum or ores, but in case of treating a very conductive material such as aluminum or brass turnings, zinc or tin skimmings from galvanizing or tinning I use a layer of said refractory checkers also above said carbonaceous resistance body so that said metals can not come in direct contact with the same before their fusing by its radiating heat, which occurs gradually with the reduction of their contained oxids by means of the reducing atmosphere within the furnace resultant from some of the carbon suitably charged with said metallic or semi-metallic materials, and therefore does not interfere with the resister, which makes the process also exceedingly operative for such last named materials.

Figure 2:
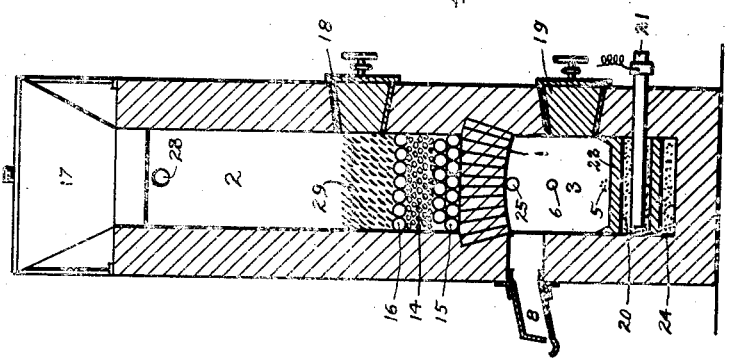
Figure 3:
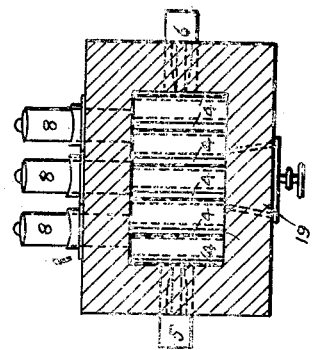

An example or embodiment of my invention is shown in the accompanying drawings in which, Figure 1, is a vertical right-left middle section; Fig. 2, a vertical front-back middle section; and Fig. 3, a horizontal cross section taken on line A—A of Fig. 1.

Like numbers refer to like parts throughout the drawing.

1 are a number of arches dividing the furnace shaft into the upper chamber or furnace 2 and lower chamber or well 3, and these arches 1 leaving spaces or canals between each other indicated by 4, and are suitably constructed of refractory material such as for instance magnesite or chrome-brick with which also the entire furnace is suitably lined within. A taphole 5 is provided on the bottom and another tapping-hole 6 above the first but below the exits 7 into the condensers 8. And said condensers are provided for the recovery of any volatile metal or metallic compound separated from the fused metal bearing material in passing through the resistance body of carbon fragments or parts and refractory checkers.

9 and 10 represent carbon electrodes both extending through the adjustable boxes 11 and 12 respectively, into the furnace 2 in about the form as shown. Said electrodes 9 and 10 are surrounded by broken carbon 13 of some form. Crushed foundry coke passing over a 0.25-inch (6 mm.) ring and through a 0.5-inch (12 mm.) ring will protect said electrodes 9 and 10 and make a good contact between the same and the resistance body 14 suitably consisting of calcined oil coke, in case of reducing or remelting aluminum, or of foundry coke for the reduction and treatment of other metals. And I use either of them crushed to pass over a 0.5-inch (12 mm.) ring and through a 0.75-inch (18 mm.) ring. And this coke, which is porous, I preferably wash or permeate with slaked lime or other suitable alkaline earth-metal salts to fill its pores, whereby not only the resistance to an electric current is promoted but also the deposition of metal within the coke is prevented, and the life of the resistance body increased giving thereby the most satisfactory and uniform results. Although the resistance body 14 can be placed directly upon the false bottom 1 as its principal sustainer above the well 3, I prefer to place between said arches 1 and resistance body 14 a layer of checkers 15 preferably in form of round balls in size of about $2\frac{1}{2}$ inches diameter, and suitably composed of magnesite or chrome-brick material. These checkers 15 offer a multitude of surfaces and spaces between the false bottom 1 and resistance body 14, leading into the canals 4 which discharge into well 3, while the same kind of checkers above the resistance body, indicated by 16 are employed only in remelting of metals, etc., as above specified, and may be removed if the furnace is used for the reduction of metals from their ores or compounds which in themselves form resisters.

17 is a hopper for the charging of the material from above, and 18 is a door provided for the charging or replenishing of the resistance body 14, and repairs. And 19 is a door provided for the cleaning of the well 3 from mushy slags and also for repairs.

20 represents a heater below the bottom of the well 3, and consists essentially of two carbon electrodes 21 and 22, spaced from each other, and an intermediate resistance body suitably consisting of crushed coke passing over a 0.25-inch (6 mm.) ring and through 0.37-inch (9 mm.) ring, in which the heat is generated to heat said well 3 and its contents if desired. And 23 indicates a refractory covering of said heater, while 24 represents a layer of a poor conductor for heat below the heater 20.

For a convenient charging of reducing and fluxing gases I have provided the pipes 25 and 26; and for the discharging of the spent gases from under the roof of the furnace the pipes 27 and 28 are provided. And 29 indicates the charged material under treatment.

For a 50-kilo-watt furnace with one pair of electrodes, as shown, the distance between the electrodes should be about 36 inches, and the cross-sectional area about 30 inches. To maintain an electrical input of 50 kw. a voltage of about 220 volts is required. The resistance body as it approaches the electrodes 9 and 10 by means of the broken carbon 13 has a very increased cross-section, so as to provide a better contact between the electrodes 9 and 10 and the resistance body 14. And this prevents undue heating at the point of contact with the electrodes, and prevents the dissipation of heat through resistance to the passage of the current except at that part of the resistance body 14 directly under the metal bearing materials under treatment. Thus in a way these increased cross-sections perform the mission of electrodes, as they conduct the current from the electrodes proper, which are located in a protected part of the furnace or boxes 11 and 12, to the part where the transformation into heat is desired, and they do this without any considerable heat being generated in these portions themselves. The temperatures that may be obtained are limited solely by the electrical input and the temperatures allowable by the refractory linings and checkers of the furnace. The available temperatures under ordinary condition are probably not less than 2000° C. The resistance material, of course, reaches a much higher temperature, hence, the efficiency of this method in the reduction of aluminum from its oxid or compounds, and the reduction and refining of other metals.

In operating the process in the preferred form the resister 14 is first started, suitably by bridging it over with some of the more conductive material 13, as will be understood by those skilled in the art, and switching the current into the resister through the electrodes 9 and 10, when the same soon will become incandescent throughout and is ready then for operation. Meantime the heater 20 heats up the well 3, and then the metal bearing materials may be charged directly upon the resistance body 14, if the same are or may become resistance conductors on heating, and if not—namely, they are to remain good conductors for electricity—then a layer of checkers 16 is first laid over the resistance body 14 so that said checkers come between the charge and said resistance body, as shown in Figs. 1 and 2, and then such material may be fed, but in that event carbon in some form, gases included, may be charged into the furnace to maintain a reducing atmosphere therein. The resultant fused mass from above the resister passes then over and through the carbonaceous composition and refractory checkers and completes the reduction and refining of the metal bearing material under treatment, which descends then through the canals 4 into the well 3 from where the metal and slag, if any, may be tapped from time to time, likewise the recovered volatile metals, if any, from the condensers. Successive charges of metal bearing materials mixed with carbon and fluxes, or reducing gases, provided such additions are necessary, may be fed in from time to time, or the charging and discharging may be carried on continuously.

The replacing of the resistance body 14 and the replenishing of the broken carbon 13 from time to time are the only items that may be classed as renewals. The metal bearing material being treated is maintained in a reducing atmosphere, the high temperatures of the carbon contact mass 13 near the resistance body 14 giving off a gas of a reducing nature which therefore can be used alone for the maintaining of a reducing atmosphere within the furnace, if desired.

The electric furnace as herein described is merely the container of the resister, but as a whole is a furnace of the resistance type by which actually the highest temperatures are available, and which varies only with the size of the furnace, and consequently with the enlarging of the furnace also the resister should be increased in size in its cross-sectional area and number of electrodes correspondingly for the necessary increased input of electrical currents if the highest efficiency of a larger furnace is desired.

Other styles of furnaces as containers for the resistance body may be employed by me, and other arrangements made for the combination of the resister 14 and heater 20, and the replenishing of the resister may be also accomplished from the carbon present in the charged material under treatment and therefore is used then in the proper size as above specified. Many other changes may be made in the mechanical arrangement which forms a part of the process itself, without departing my from invention.

The advantages of my invention result from the use of the resister or resistance body of carbonaceous material in combination with refractory checkers through which the fused metal bearing material under treatment has to pass for its final reduction and refining. The operation is continuous and rapid and the cost of the furnace and its operation is small.

I claim:—

1. In an electric smelting and refining furnace of the character herein described, the combination of two chambers, an upper chamber provided with a resister over checkers upon a false bottom dividing the furnace into said two chambers, and checkers adjacent to and above said resister.

2. In an electric smelting and refining furnace of the character herein described, the combination of two chambers, an upper chamber provided with a resister and checkers, and a lower chamber or well with a series of condensers attached thereto, and means for heating the well, as and for the purpose described.

3. In an electric smelting and refining furnace of the character herein described, the combination of checkers and a resister with the resister-bed, the resister consisting of carbonaceous materials in contact with carbon electrodes; and means for charging and recharging or maintaining of the resister, and means for relieving said resister of the reduced and refined metal automatically, and means for the charging of the raw materials and reducing gases, and means for the discharging of the resultant product and spent gases, substantially as described.

4. In an electric smelting and refining furnace of the character herein described, the combination therein of two chambers resultant from a horizontally placed false bottom between the walls of the furnace, and upon which a carbon resister in combination with refractory checkers is so arranged as to permit the passage of the reducing gases and of the reduced non-volatile and volatile metals formed in the resister into the chamber or well beneath the false bottom, and means for heating the well, and a series of condensers attached to the well, as and for the purpose specified.

5. In an electric smelting and refining furnace of the character herein described, the combination therein of two chambers resultant from a false bottom placed between the walls of the furnace and upon which a carbon resister in combination with refractory checkers is so arranged as to prevent the direct contact of the unfused charge with said resister but permit the passage of the reducing and fluxing gases, and of the fused non-volatile and volatile metals through said resister into the chamber or well beneath the false bottom, and means for heating the well, and a number of condensers attached to the well, as and for the purpose specified.

HEINRICH F. D. SCHWAHN.

Witnesses:
  MAX DORN,
  N. A. DAVIS.